(12) United States Patent
Kung

(10) Patent No.: US 8,446,053 B2
(45) Date of Patent: May 21, 2013

(54) COMPUTER SYSTEM

(75) Inventor: Fan-Chin Kung, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 359 days.

(21) Appl. No.: 12/872,633

(22) Filed: Aug. 31, 2010

(65) Prior Publication Data

US 2012/0030483 A1    Feb. 2, 2012

(51) Int. Cl.
*G05F 3/06*    (2006.01)

(52) U.S. Cl.
USPC .......................................................... 307/151

(58) Field of Classification Search ................... 307/151, 307/150
See application file for complete search history.

(56) References Cited

U.S. PATENT DOCUMENTS 7,256,517 B2 *   8/2007   Jablonski et al. ................ 307/75
2007/0155226 A1 *   7/2007   Chen ............................. 439/544

* cited by examiner

*Primary Examiner* — Robert L. Deberadinis
(74) *Attorney, Agent, or Firm* — Altis Law Group, Inc.

(57) ABSTRACT

A computer system includes a power supply, a number of first power interfaces, a second power interface, and a voltage regulating module. The power supply includes a number of direct current (DC) voltage output terminals, to output a number of DC voltages to a motherboard of the computer system. The first power interfaces are connected to the DC voltage output terminals of the power supply, to output the DC voltages to first peripheral devices. The voltage regulating module includes an input terminal and an output terminal. The input terminal is connected to one of the DC voltage output terminals of the power supply, to receive the DC voltage from the connected DC voltage output terminal. The output terminal is connected to the second power interface, to output a regulated second voltage to a second peripheral device through the second power interface.

5 Claims, 3 Drawing Sheets

COMPUTER SYSTEM

BACKGROUND

1. Technical Field

The present disclosure relates to computer systems, and particularly to a computer system with a number of power interfaces.

2. Description of Related Art

At present, a number of peripheral devices, such as modems, routers, set top boxes may be connected to a computer system for expanding the computer's functions. However, the peripheral devices need their own special adapters to provide required input voltages. These adapters are heavy transformers, and occupy many ports of an alternating current power socket. Therefore, there is room for improvement in the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

The disclosure, including the drawings is illustrated by way of example and not by limitation. It should be noted that references to "an" or "one" embodiment in this disclosure are not necessarily to the same embodiment, and such references mean at least one.

Figure 1:
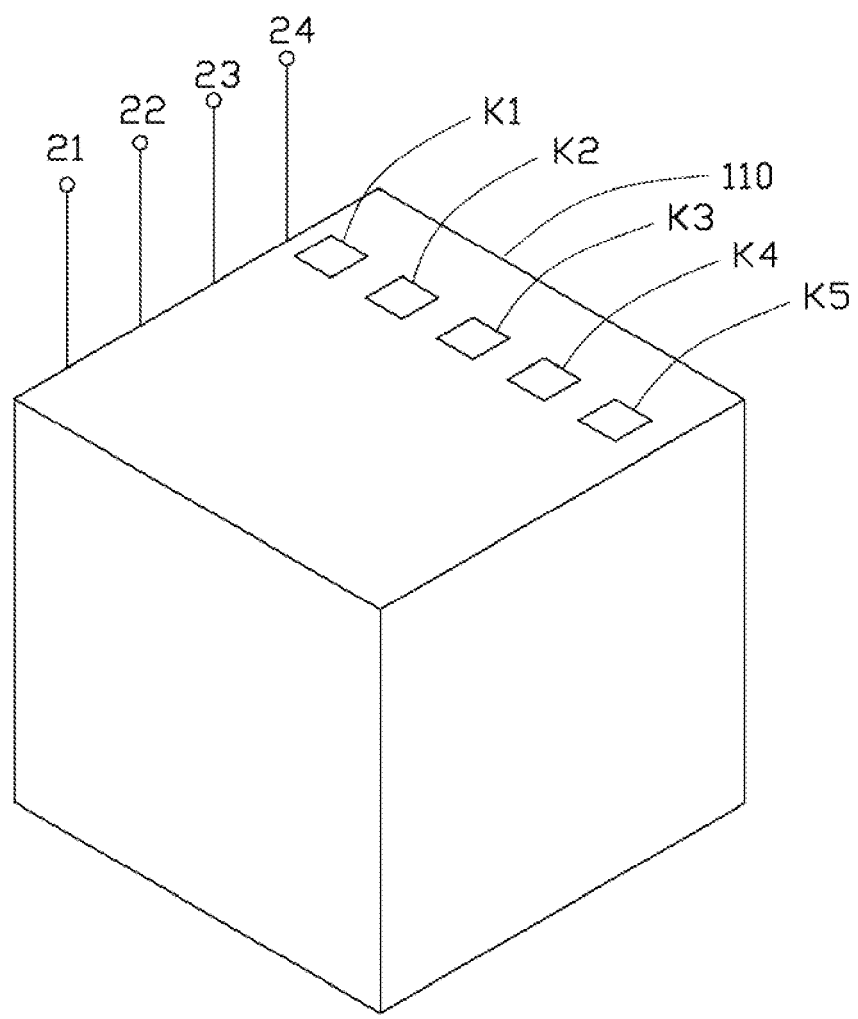
FIG. 1 is a schematic diagram of an exemplary embodiment of a computer system.
Figure 2:
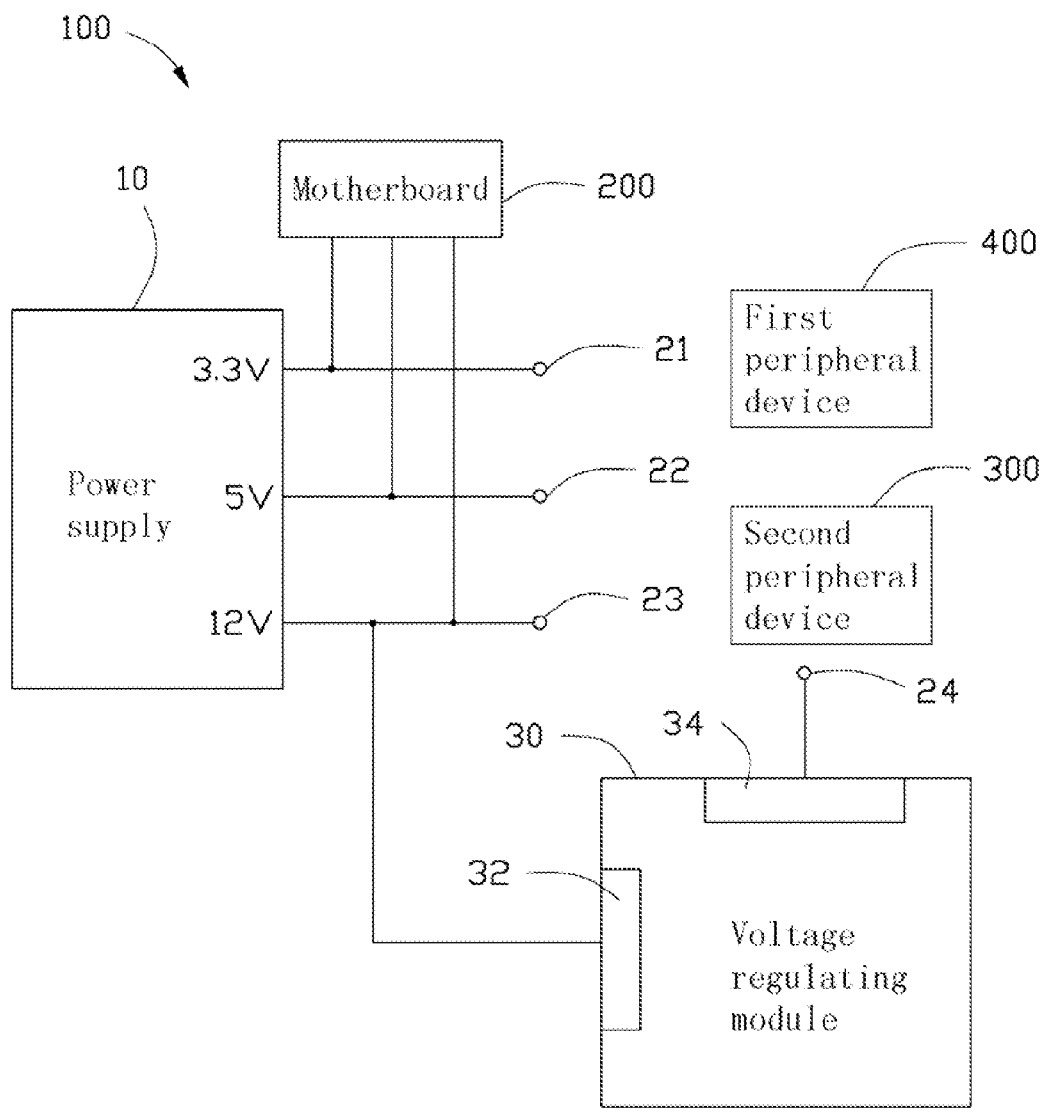
FIG. 2 is a block diagram of the computer system of FIG. 1, the computer system includes a voltage regulating module.

Referring to FIGS. 1 and 2, an embodiment of a computer system 100 includes a power supply 10, a 3.3 volt (V) power interface 21, a 5 volt (V) power interface 22, a 12 volt (V) power interface 23, a regulating power interface 24, and a voltage regulating module 30. The power supply 10 and the voltage regulating module 30 are arranged in a shell 110 of the computer system 100. The 3.3V power interface 21, the 5V power interface 22, the 12V power interface 23 are respectively connected to the power supply 10 with cables. The regulating power interface 24 is connected to the power supply 10 through the voltage regulating module 30. The power supply 10 converts an alternating current (AC) voltage to a number of direct current (DC) voltages, such as +3.3V, +5V, and +12V, to be provided to a motherboard 200 of the computer system 100.

The 3.3V power interface 21, the 5V power interface 22, and the 12V power interface 23 are respectively connected to a 3.3V voltage output terminal, a 5V voltage output terminal, and a 12V voltage output terminal of the power supply 10. The regulating power interface 24 is connected to the 12V output terminal of the power supply 10 through the voltage regulating module 30. The voltage regulating module 30 regulates the 12 volts to other voltages, such as 10 volts, to be provided to a second peripheral device 300, such as modems, routers, or set top boxes, through the regulating power interface 24.

Figure 3:
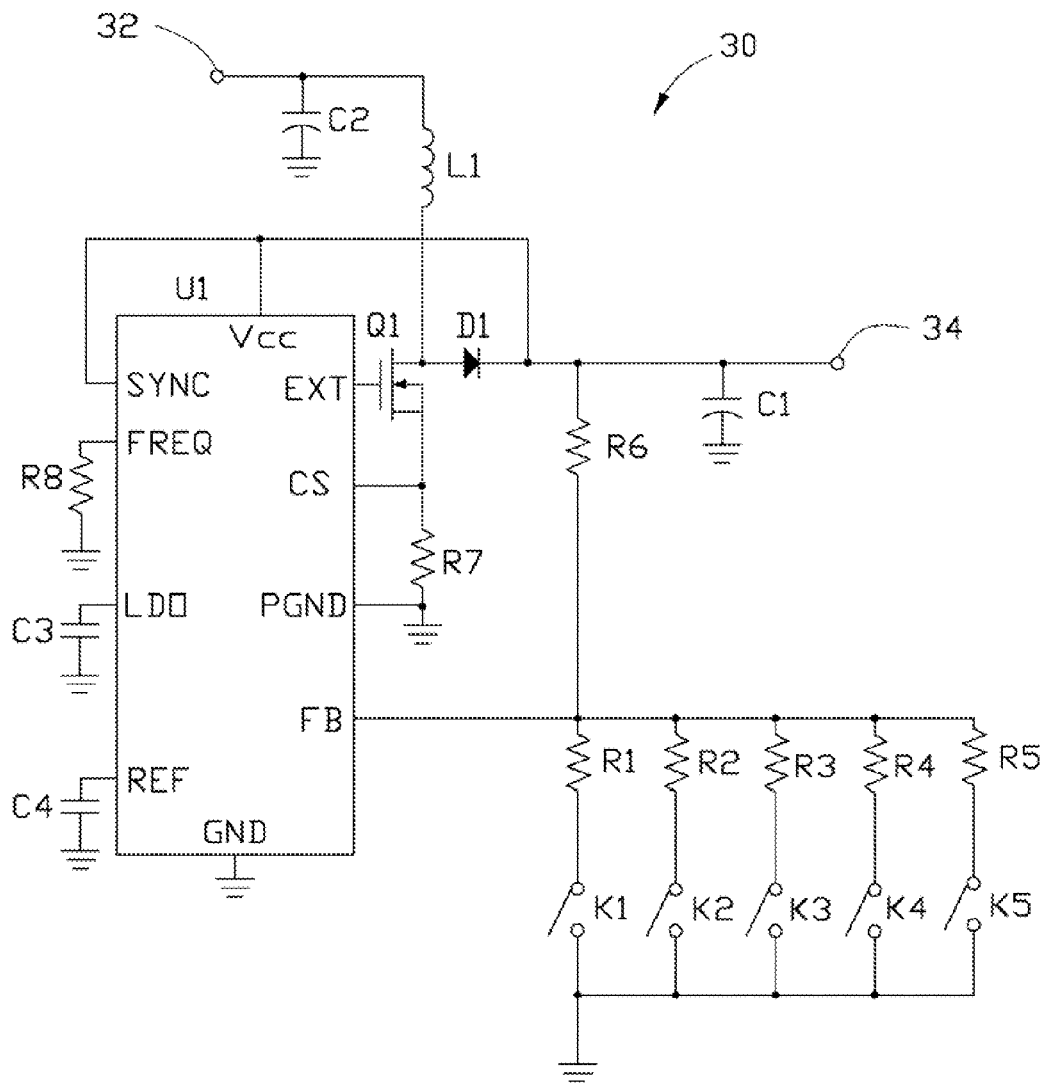
FIG. 3 is a circuit diagram of the voltage regulating module of FIG. 2.

Referring to FIG. 3, the voltage regulating module 30 includes an input terminal 32, an output terminal 34, a voltage control chip U1, resistors R1-R8, capacitors C1-C4, a field effect transistor (FET) Q1, a zener diode D1, and switches K1-K5. In one embodiment, the number of the switches K1-K5 is five. The switches K1-K5 each correspond to a rated voltage, such as 10V, 16V, 18V, 20V, and 21V. When one switch, for example, the switch K1 is pressed, the resistor R1 is connected to divide the voltage. The output terminal 34 outputs the rated 10V corresponding to the switch K1 to the peripheral device, which is connected to the regulating power interface 24. In one embodiment, the switches K1-K5 are set on the shell 110 of the computer system 100. Locations and the number of the switches K1-K5 can be designed according to need. The type of the voltage control chip U1 is MAX669. In other embodiments, the number of the voltage regulating modules 30 can be selected according to need.

A control pin EXT of the voltage control chip U1 is connected to a gate of the FET Q1. A source of the FET Q1 is grounded through the resistor R7. A current pin CS of the voltage control chip U1 is connected to a node between the source of the FET Q1 and the resistor R7. A ground pin PGND of the voltage control chip U1 is grounded. A drain of the FET Q1 is connected to the input terminal 32 through the inductance L1 and is connected to an anode of the diode D1. The capacitor C2 is connected between the input terminal 32 and ground. A cathode of the diode D1 is connected to two voltage pins Vcc and SYNC of the voltage control chip U1 and also connected to the output terminal 34. The capacitor C1 is connected between the output terminal 34 and ground. The resistor R6 is connected between the cathode of the diode D1 and a feedback pin FB of the voltage control chip U1. The first ends of the resistors R1-R5 are connected to a node between the resistor R6 and the feedback pin FB. The second ends of the resistors R1-R5 are connected to ground respectively through the switches K1-K5. The resistor R8 is connected between a frequency pin FREQ of the voltage control chip U1 and ground. The capacitor C3 is connected between a regulating pin LDO of the voltage control chip U1 and ground. The capacitor C4 is connected between a reference pin REF of the voltage control chip U1 and ground.

When the computer system 100 is started, the power supply 10 outputs a number of DC voltages to the motherboard 200 of the computer system 100. The motherboard 200 is powered on. At the same time, the power supply 10 outputs the 3.3V, 5V, and 12V voltages to different first peripheral devices 400, which are connected to the 3.3V power interface 21, the 5V power interface 22, and the 12V power interface 23.

The second peripheral device 300 is connected to the regulating power interface 24 of the computer system 100 which needs a voltage except the 3.3V, 5V, and 12V. In use, one switch according to the needed voltage is selected from the switches K1-K5. For example, the operating voltage of the second peripheral device 300 is 10V, and the switch K1 is configured for 10V, then the switch K1 is pressed after the second peripheral device 300 is connected to the regulating power interface 24. The power supply 10 provides the 10V to the second peripheral device 300 through the regulating power interface 24. The working principle is described as follows: before the second peripheral device 300 is connected to the regulating interface 24, the control pin EXT of the voltage control chip U1 outputs a high level signal, the FET Q1 is turned on, the drain of the FET Q1 is at a low level, and the zener diode D1 is turned off. The 12V output terminal of the power supply 10 provides a 12V to charge the inductance L1 through the input terminal 32. When the second peripheral device 300 is connected to the regulating interface 24, the control pin EXT of the voltage regulating chip U1 outputs a low level signal, and the FET Q1 is turned off. The inductance L1 discharges, and the zener diode D1 is turned on. The resistors R6 and R1 are configured to divide the voltage, and the output terminal 34 outputs 10V to the second peripheral device 300.

One switch of the switches K1-K5 can be selected according to different needed voltages of different peripheral devices, which is selectively connected to the regulating power interface 24. When the selected switch is pressed, the voltage output terminal 34 outputs the needed voltage to the peripheral device through the regulating power interface 24. In other embodiments, the peripheral devices may be notebook computers or mobile phones.

The computer system can provide different voltages to different peripheral devices, but does not need to provide a special adapter for each peripheral device. Therefore, the computer system has low energy consumption, and occupies less ports of the AC power socket.

It is to be understood, however, that even though numerous characteristics and advantages of the present disclosure have been set forth in the foregoing description, together with details of the structure and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A computer system comprising:
    a power supply comprising a plurality of direct current (DC) voltage output terminals, to output a plurality of DC voltages to a motherboard of the computer system;
    a plurality of first power interfaces each connected to one of the plurality of the DC voltage output terminals of the power supply, to output the DC voltages to first peripheral devices;
    a second power interface; and
    a voltage regulating module comprising an input terminal and an output terminal, the input terminal connected to one of the plurality of DC voltage output terminals of the power supply, to receive the DC voltage from the connected DC voltage output terminal, the output terminal connected to the second power interface, to output a regulated second voltage to a second peripheral device through the second power interface;
    wherein the voltage regulating module comprises a voltage control chip, a field effect transistor (FET), a zener diode, an inductance, a first resistor, a second resistor, a plurality of third resistors, and a plurality of switches corresponding, to the third resistors, a control pin of the voltage control chip is connected to a gate of the FET, as source of the FET is connected to a current pin of the voltage control chip and also grounded through the first resistor, a drain of the FET is connected to the DC voltage output terminal of the power supply through the inductance and also connected to an anode of the zener diode, a cathode of the zener diode is connected to two voltage pins of the voltage control chip and also connected to the second power interface, the second resistor is connected between the cathode of the zener diode and a feedback pin of the voltage control chip, each of the third resistors and the corresponding switch are connected in series between the feedback pin of the voltage control chip and ground; before the peripheral device is connected to the second power interface, the control pin of the voltage control chip outputs a high level signal, the FET is turned on, the drain of the FET is at a low level, the zener diode is turned off, and the connected DC voltage output terminal of the power supply provides a voltage to charge the inductance; when the peripheral device is connected to the second power interface, the control pin of the voltage control chip outputs a low level signal, FET is turned off, the inductance discharges, the zener diode is turned on, when one of the switches is pressed, the second resistor and the corresponding third resistor are configured to the divide voltage, such that the voltage regulating module outputs a corresponding voltage to the second power interface.

2. The computer system of claim 1, wherein the power supply and the voltage regulating module are arranged in a shell of the computer system, the first power interfaces and the second power interface are exposed from the shell; the first power interfaces are connected to the power supply with cables, the second power interface is connected to the power supply through the voltage regulating module.

3. The computer system of claim 2, wherein the switches are set on the shell of the computer system.

4. The computer system of claim 1, wherein the voltage regulating module further comprises a first capacitor and a second capacitor, the first capacitor is connected between the cathode of the zener diode and ground, the second capacitor is connected between the inductance and ground.

5. A power supply comprising:
    an alternating current input terminal;
    a plurality of direct current (DC) voltage output terminals;
    a plurality of first power interfaces each connected to one of the plurality the DC voltage output terminals;
    a second power interface; and
    a voltage regulating module comprising an input terminal and an output terminal, the input terminal connected to one of the plurality of DC voltage output terminals, the output terminal connected to the second power interface, to output a plurality of regulated second voltage to a peripheral device through the second power interface;
    wherein the voltage regulating module comprises a voltage control chip, a field effect transistor (FET), a zener diode, an inductance, a first resistor, a second resistor, a plurality of third resistors, and a plurality of switches corresponding to the third resistors, a control pin of the voltage control chip is connected to a gate of the FET, a source of the FET is connected to a current pin of the voltage control chip and also grounded through the first resistor, a drain of the FET is connected to the DC voltage output terminal through the inductance and also connected to an anode of the zener diode, a cathode of the zener diode is connected to two voltage pins of the voltage control chip and also connected to the second power interface, the second resistor is connected between the cathode of the zener diode and a feedback pin of the voltage control chip, each of the third resistors and the corresponding switch are connected in series between the feedback pin of the voltage control chip and ground; before the peripheral device is connected to the second power interface, the control pin of the voltage control chip outputs a high level signal, the FET is turned on, the drain of the FET is at a low level, the zener diode is turned off, and the connected DC voltage output terminal provides a voltage to charge the inductance; when the peripheral device is connected to the second power interface, the control pin of the voltage control chip outputs a low level signal, the FET is turned off, the inductance discharges, the zener diode is turned on, when one of the switches is pressed, the second resistor and the corresponding third resistor are configured to divide voltage, such that the voltage regulating module outputs a corresponding voltage to the second power interface.

* * * * *